United States Patent [19]

De Pieri

[11] Patent Number: 5,551,466
[45] Date of Patent: Sep. 3, 1996

[54] HYDRAULIC VALVE

[75] Inventor: Timothy De Pieri, Fulham Gardens, Australia

[73] Assignee: Caroma Industries Limited, Queensland, Australia

[21] Appl. No.: 306,756

[22] Filed: Sep. 15, 1994

[30] Foreign Application Priority Data

Sep. 20, 1993 [AU] Australia ................. PM1316

[51] Int. Cl.⁶ ............................ F16K 21/18; F16K 1/12
[52] U.S. Cl. ........................... 137/1; 137/218; 137/432; 137/437; 137/446; 137/450; 251/282
[58] Field of Search ................. 137/218, 432, 137/437, 446, 449, 450, 1; 251/282

[56] References Cited

U.S. PATENT DOCUMENTS

| 2,738,801 | 3/1956 | Reaves ..................... 137/426 |
| 2,827,073 | 3/1958 | Owens ..................... 137/437 X |
| 3,820,754 | 6/1974 | Caron et al. ............... 251/38 |
| 4,593,881 | 6/1986 | Yoshino ................... 251/282 X |
| 4,813,452 | 3/1989 | Smith . | |

FOREIGN PATENT DOCUMENTS

| 19 15 572.7 | 10/1970 | Germany . |
| 20 10 794.2 | 9/1971 | Germany . |
| 176299 | 6/1961 | Sweden . |
| 381252 | 10/1932 | United Kingdom . |
| 861036 | 2/1961 | United Kingdom . |
| 1531502 | 11/1978 | United Kingdom . |

OTHER PUBLICATIONS

European Search Report for Application No. EP 94 11 4638. Search completed Dec. 2, 1994.

*Primary Examiner*—Gerald A. Michalsky
*Attorney, Agent, or Firm*—Merchant, Gould, Smith, Edell, Welter & Schmidt, et al.

[57] ABSTRACT

The present invention discloses a valve which utilises an imbalance of flow induced pressure forces to keep the valve open or closed. The valve has an interior cavity (15) into which an opposite and aligned inlet (12) and outlet (13) open. A bulbous body (16) is located within the cavity and is reciprocally mounted on a spindle (17) which passes through the outlet. Movement of the body increases the flow area at one end of the body and decreases the flow area at the other end of the body. In accordance with Bernoulli's theory this changes the pressures acting on the body (16) giving rise to a net force on the body. A cistern inlet valve (111,211) and cistern (19) are also disclosed.

18 Claims, 9 Drawing Sheets

HYDRAULIC VALVE

FIELD OF THE INVENTION

The present invention relates to a pressure and flow balanced hydraulic valve which finds particular application as an inlet valve for cisterns (or flush tanks as they are known in the USA). However, the valve of the present invention is not limited to this particular application. The invention also relates to cistern inlet valves and cisterns.

BACKGROUND ART

Prior art valves for cisterns may be conveniently divided into two broad categories. The first category is mechanical leverage valves having a valve seat with a circular orifice therein, and a disc which is moved by a float arm to open or occlude the circular orifice. A float attached to the float arm provides a buoyant force which is magnified by the mechanical advantage available because of the length of the float arm. Such an arrangement is relatively simple, very reliable, and has been in use for many years.

However, in recent times the average width of cisterns has been reduced because of a reduction in the volume of water used to flush lavatory pans. Since smaller volumes of water are required, corresponding reductions in the size of the cisterns used to hold the flushing water have also been achieved. As a consequence, the length of the float arm previously able to be used, cannot now be used for such cisterns. As a result, the closing force of the mechanical inlet valve referred to above is reduced. This renders this type of valve unsuitable for use in those areas having high water pressures.

As a consequence of this development, hydraulic inlet valves are increasingly utilised in cisterns. A hydraulic inlet valve utilises the inlet pressure to assist in closing the valve by applying inlet pressure to a relatively large opposite face of the valve member so that a net closing force is achieved. However, hydraulic inlet valves suffer from several disadvantages. One disadvantage is that in the event of a failure of one of the valve components, the hydraulic inlet valve always fails open. That is to say, the valve failure results in flow of water being unable to be stopped. Since the consequence is a flooded bathroom and a substantial loss of water, by far the better arrangement is that the valve, if it were to fail at all, should fail closed. Then the consequence would be that no flow of water could be initiated.

In relation to cistern inlet valves, in addition to failing closed, another desired ligature is quiet operation. Traditionally, inlet valves have been a source of surprisingly substantial noise volumes during their operation. Since the flushing operation is of a relatively short duration, but the re-filling of the cistern with the next flushing water volume takes a substantial time, the noise generated by the inlet valve is present during the entire cistern filling period. This noise is generated by cavitation, turbulence and water tree surface noises (the latter being due to water-air-water interfaces). A substantial marketing advantage is available if a quiet cistern inlet valve can be achieved.

SUMMARY OF THE INVENTION

The present invention arises frown research carried out with a view to attempting to ameliorate the abovementioned disadvantages and at least partially achieve the above described advantages. Accordingly, it is the object of the present invention to provide an improved valve.

According to a first aspect of the present invention there is disclosed a pressure and flow balanced valve comprising a valve housing which has an inlet leading into, and an outlet leading from, an interior cavity, with said inlet and outlet being substantially opposed, and a generally bulbous valve body located within said cavity and mounted for movement towards and away from said outlet, said valve body and outlet being sized to permit said outlet to be occluded by said valve body; wherein the interior surface of said cavity and the exterior surface of said valve body are shaped and arranged to reduce the cross-sectional area available for flow towards said outlet and between said valve body and cavity, and simultaneously increase the cross-sectional area available tier flow from said inlet and between said valve body and cavity, as said valve body moves towards said outlet, and vice versa as said valve body moves away from said outlet, to thereby alter the balance of the flow velocity induced pressure forces acting on said valve body.

Preferably, the bulbous valve body is an ovoid, ellipsoid or a Rankine ovuloid.

In accordance with a second aspect of the present invention there is disclosed a method of controlling flow through a pressure and flow balanced valve comprising a valve housing which has an inlet leading into, and an outlet leading from, an interior cavity, with said inlet and outlet being substantially opposed, and a generally bulbous valve body located within said cavity, said method comprising the steps of:

moving said valve body away from said outlet to increase the cross-sectional area available for flow between said body and said cavity adjacent said outlet and to simultaneously reduce the cross-sectional area available for flow between said body and said cavity adjacent said inlet, to thereby apply a net flow induced pressure force to said body acting to continue said valve body motion away from said outlet and open said valve, and moving said valve body towards said outlet to reduce the cross-sectional area available for flow between said body and said cavity adjacent said outlet and to simultaneously increase the cross-sectional area available for flow between said body and said cavity adjacent said inlet, to thereby apply a net flow induced pressure force to said body acting to continue said valve body motion towards said outlet and close said valve.

In accordance with a third aspect of the present invention there is disclosed a cistern having a cistern inlet valve in which the valve is of the above type.

In accordance with a fourth aspect of the present invention there is disclosed a method of filling a cistern utilising the above method of controlling flow through a valve.

BRIEF DESCRIPTION OF THE DRAWINGS

Three embodiments of the present invention will now be described with reference to the drawings in which.

DETAILED DESCRIPTION

Figure 1:
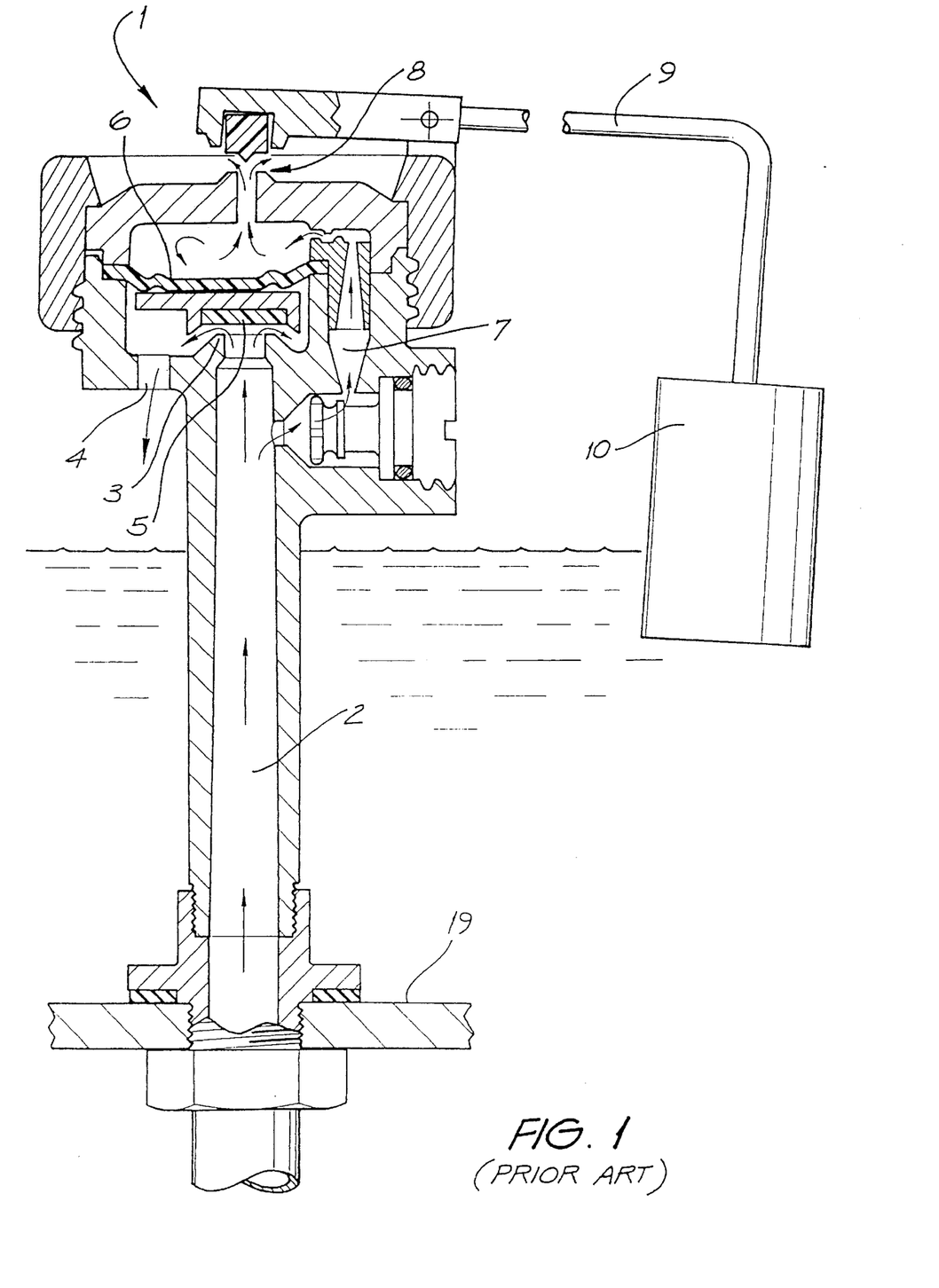
FIG. 1 is a cross-sectional view through a substantially conventional hydraulic inlet valve.

FIG. 1 illustrates a prior art hydraulically operated cistern inlet valve. The valve is substantially as described in Australian Patent Application No. 81732/91 in the name of the present applicant. As seen in FIG. 1, the hydraulic inlet valve 1 has an inlet 2 which leads to a valve seat 3 and an outlet 4. The valve seat 3 is closed by a valve member 5 carried on a rubber diaphragm 6. A by-pass channel 7 allows water from the inlet 2 to be directed to the downstream side of the diaphragm 6. A secondary valve 8 operated by a float arm 9 and float 10, controls the pressure applied to the downstream side of the diaphragm 6.

In operation, with the secondary valve 8 open as illustrated in FIG. 1, water is able to pass from the inlet 2 to the downstream side of the diaphragm and thence out the secondary valve 8. Accordingly, there is no substantial pressure applied to the downstream side of the diaphragm 6 and therefore the valve member 5 is moved away from the valve seat 3 by the pressure of water in the inlet 2. This enables the hydraulic inlet valve 1 to open and the water to pass from the inlet 2 through the valve seat 3 and out the outlet 4.

In the event that the cistern 19 fills with water, the float 10 rises and the float arm 9 therefore closes the secondary valve 8. As a consequence, the inlet pressure is applied to the large surface area of the downstream side of the diaphragm 6. The same pressure is applied to the relatively small surface of the valve member 5 which directly laces the inlet, however, the difference in area results in a net closing force being applied via the diaphragm 6 to the valve member 5. Accordingly, the valve member 5 abuts the valve seat 3 and closes the hydraulic inlet valve.

Such a hydraulic inlet valve is able to fail in a number of ways. One way is for the diaphragm 6 to be perforated thereby allowing water to leak from the downstream side of the diaphragm 6 into the outlet 4 thereby reducing the closing pressure on the valve member 5 and causing the inlet valve to fail in an open condition. Similarly, the by-pass channel 7 can become blocked. This again reduces the pressure applied to the downstream side of the diaphragm 6 and again causes the valve to fail open. Further, an impurity can become lodged in the secondary valve 8 which therefore prevents it closing completely. Again this reduces the pressure applied to the downstream side of the diaphragm 6 and results in the hydraulic inlet valve failing in an open condition.

Figure 2:
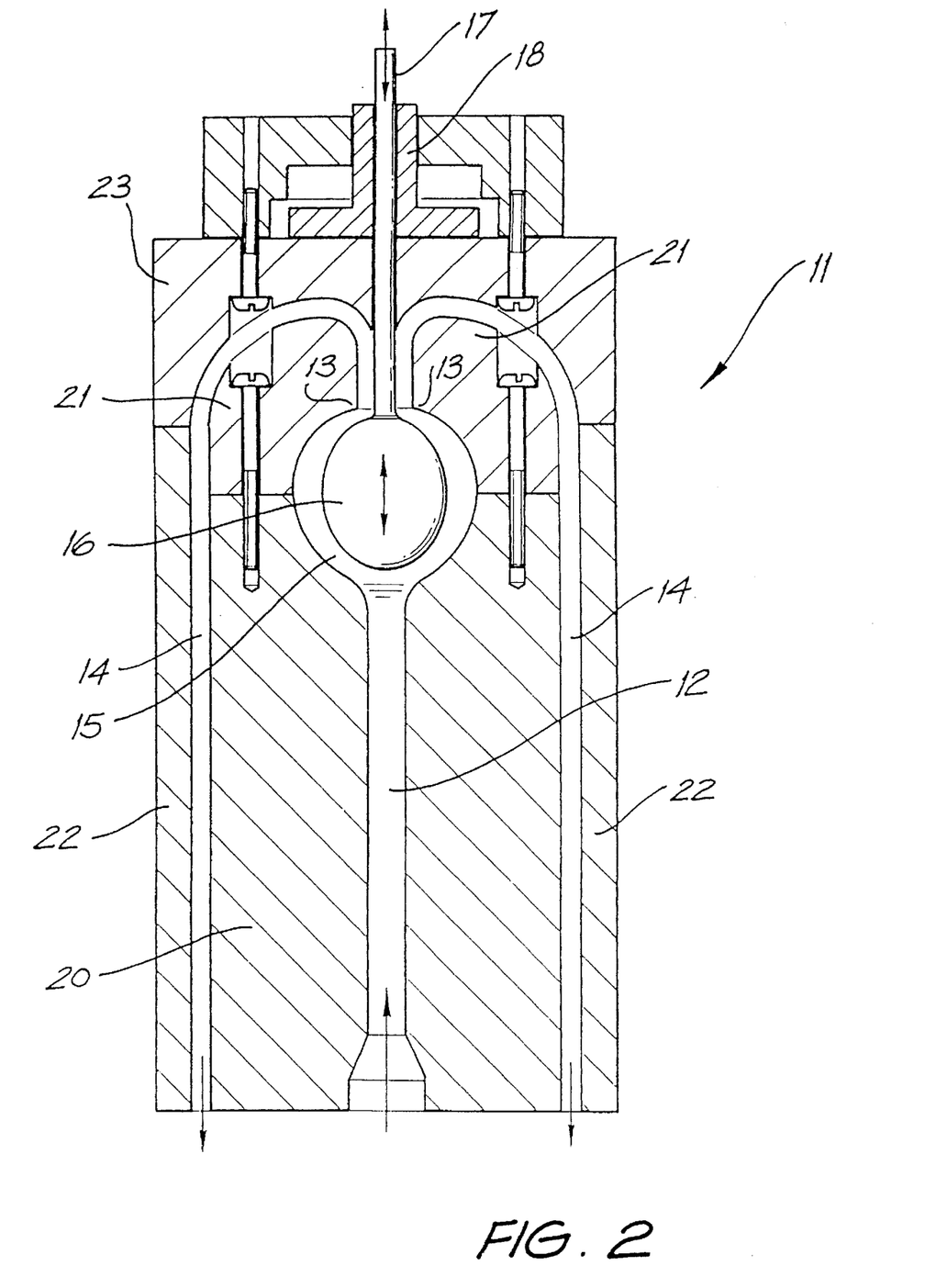
FIG. 2 is an equivalent cross-sectional view through an inlet valve of a first embodiment.

Turning now to FIG. 2, a pressure and flow balanced valve 11 of the first embodiment of the present invention is illustrated. The valve 11 has an inlet 12, a valve seat 13 and a substantially cylindrical outlet 14. Located between the inlet 12 and the outlet 14 is a cavity 15 within which is located a generally bulbous valve body 16. The valve body 16 is supported by a spindle 17 which is slidingly retained in a bush 18.

As a matter of construction, the valve 11 is formed from an inner body 20 which contains the inlet 12 and to which is secured a shaped annulus 21 which together with the inner body 20 forms the cavity 15. A cylindrical outer body 22 is located around the inner body 20 and the passage between these two defines the outlet 14. A crown piece 23 completes the outlet 14 and provides a support for the bush 18.

It will be apparent that if the spindle 17 is moved upwardly, then the valve body 16 occludes the valve seat 13 thereby preventing any flow from the inlet 12 to the outlet 14. Conversely, if the spindle 17 is pushed downwardly, then the valve seat is opened and water is able to flow through the inlet 12, between the cavity 15 and valve body 16, past the valve seat 13 and into the outlet 14.

Since the interior surfaces of the inlet 12, cavity 15, valve body 16 and outlet 14 are smooth and include gentle curves which define a flow path that mimicks theoretical streamlines, the flow of water exhibits substantially streamlined behaviour. Thus separation, turbulence and cavitation are minimised. Accordingly, a substantially quiet flow is achieved.

Figure 3:
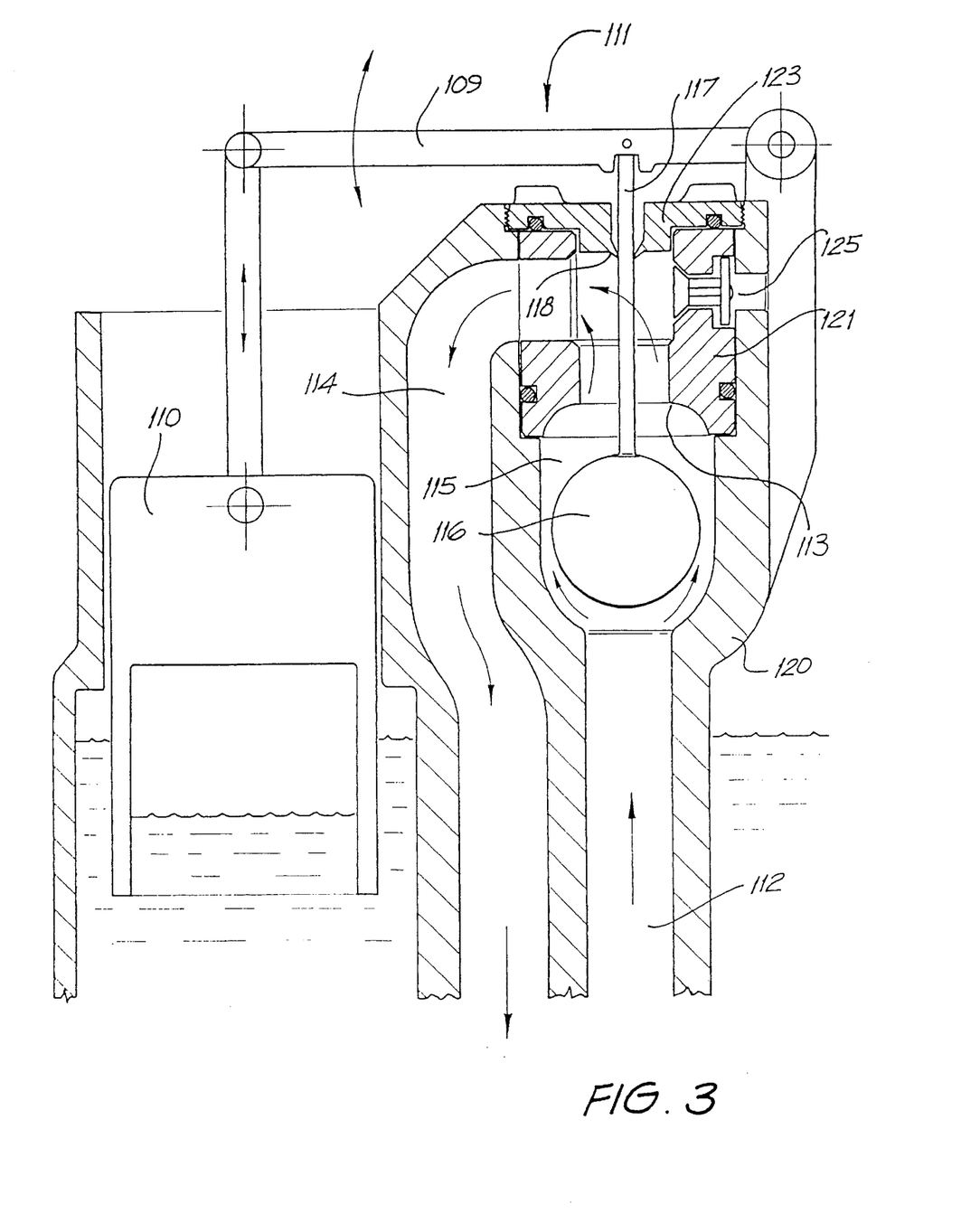
FIG. 3 is an equivalent cross-sectional view through an inlet valve of a second embodiment.

A minor disadvantage of the arrangement of FIG. 2 is that the annular outlet 14 includes a substantial volume of air which must be completely removed before the quietest possible flow is achieved. To this end, a second embodiment as illustrated in FIG. 3 has been created. The pressure and flow balanced valve 111 of FIG. 3 includes an inlet 112, a valve seat 113, and a single tubular outlet 114. As before the valve 111 also includes a cavity 115 and a valve body 116 mounted on a spindle 117. The spindle 117 is pivotally connected to a float arm 109 which is movable in an arc by a float 110.

The inlet 112 and outlet 114 are formed together in a main body 120 into which an annulus 121 is positioned and held in place by a crown 123 which is threadably engaged with the main body 120. The annulus 121 and main body 120 together define the cavity 115. The crown 123 also includes a supporting bush 118 for the spindle 117. It will be appreciated in this connection that sealing between the bush 118 and spindle 117 is not critical since water is only present in the outlet 114 when the valve 11 is open.

Figure 4:
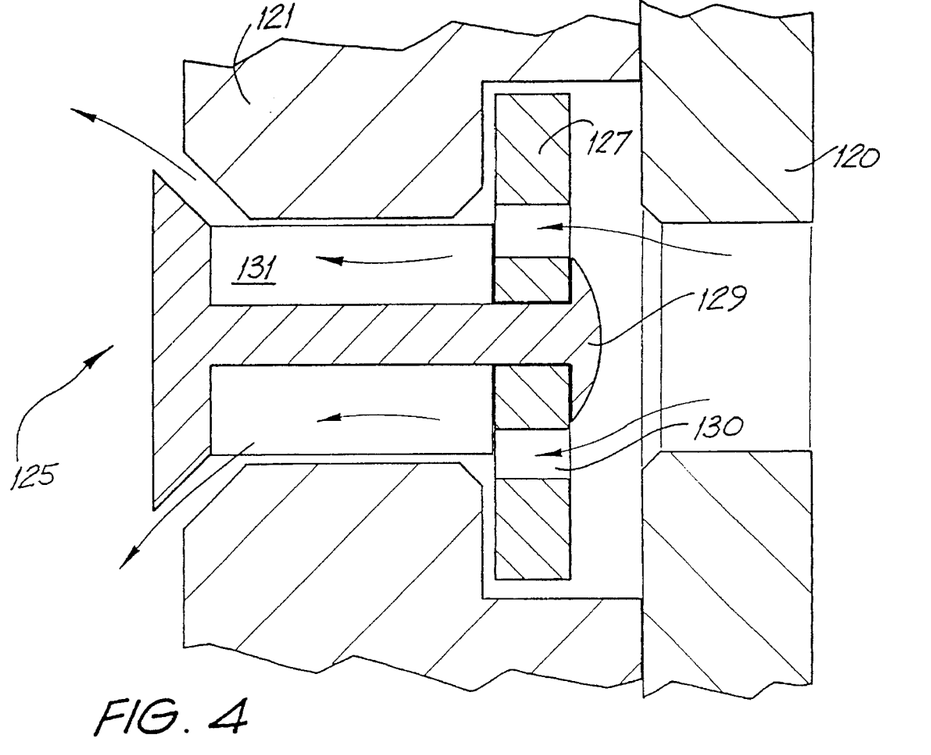
FIG. 4 is a an enlarged cross-sectional view through the siphon breaking poppet included in the valve of FIG. 3.
Figure 5:
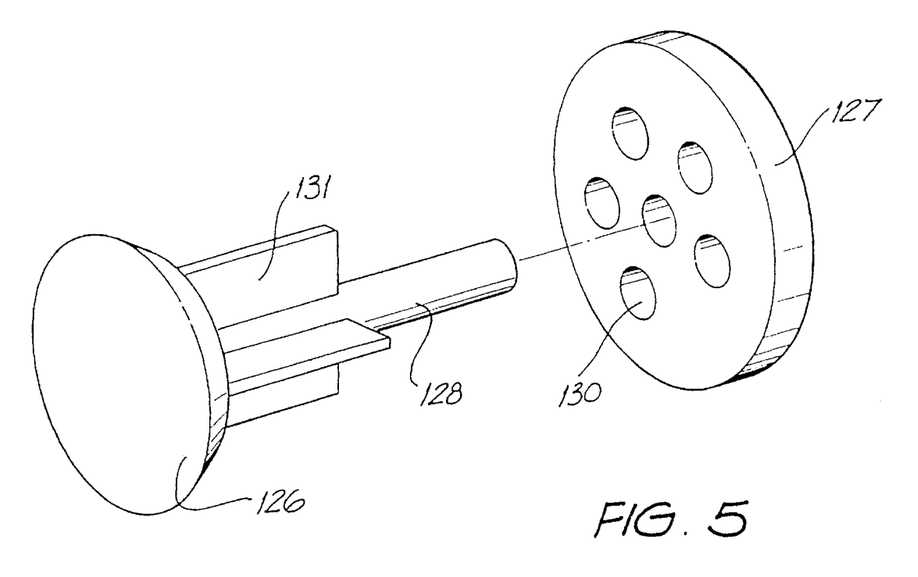
FIG. 5 is an exploded perspective view of the popper of FIG. 4 prior to assembly.

Also included in the annulus 121 is a siphon breaking popper 125 which, as best seen in FIGS. 4 and 5, is formed from a tinned T-shaped valve 126 and an apertured disc 127. After the disc 127 has been located on the stem 128 of the valve 126, a disc retaining head 129 is formed on the stem 128. Because there are five apertures 130 and four fins 131, it is always possible for air to pass through the disc 127 and into the outlet 114 provided the valve 126 does not abut the annulus 121. The purpose of the poppet 125 is to ensure that when the valve 111 closes, and the pressure is thereby reduced in the outlet 114, air enters into the outlet 114 so that water is not retained in the outlet 114 above the level of water in the cistern. As a consequence, should a negative pressure be inadvertently applied to the inlet 112, it is not possible for water to flow in a siphonic fashion out of the cistern and into the inlet.

Figure 6:
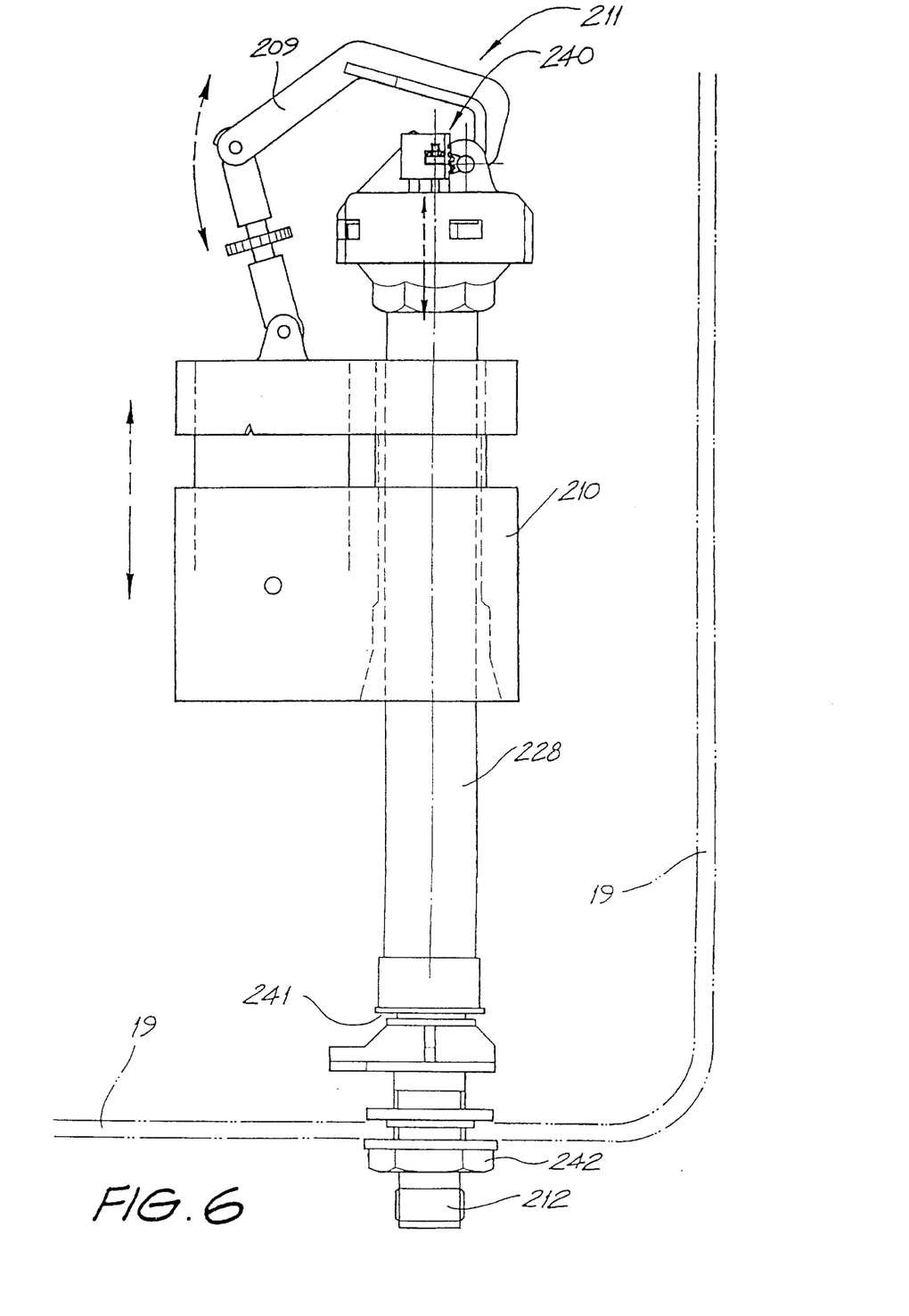
FIG. 6 is a side elevation of an inlet valve of a third embodiment.

As seen in FIG. 6, the inlet valve 211 of the third embodiment sits at the top of a stem 228 on which a float 210 rises or falls in accordance with the level of water within the cistern 19. The float 210 is connected to the inlet valve 211 by means of a float arm 209. A rack and pinion mechanism 240 interconnects the float arm 209 and the inlet valve 211.

Figure 7:
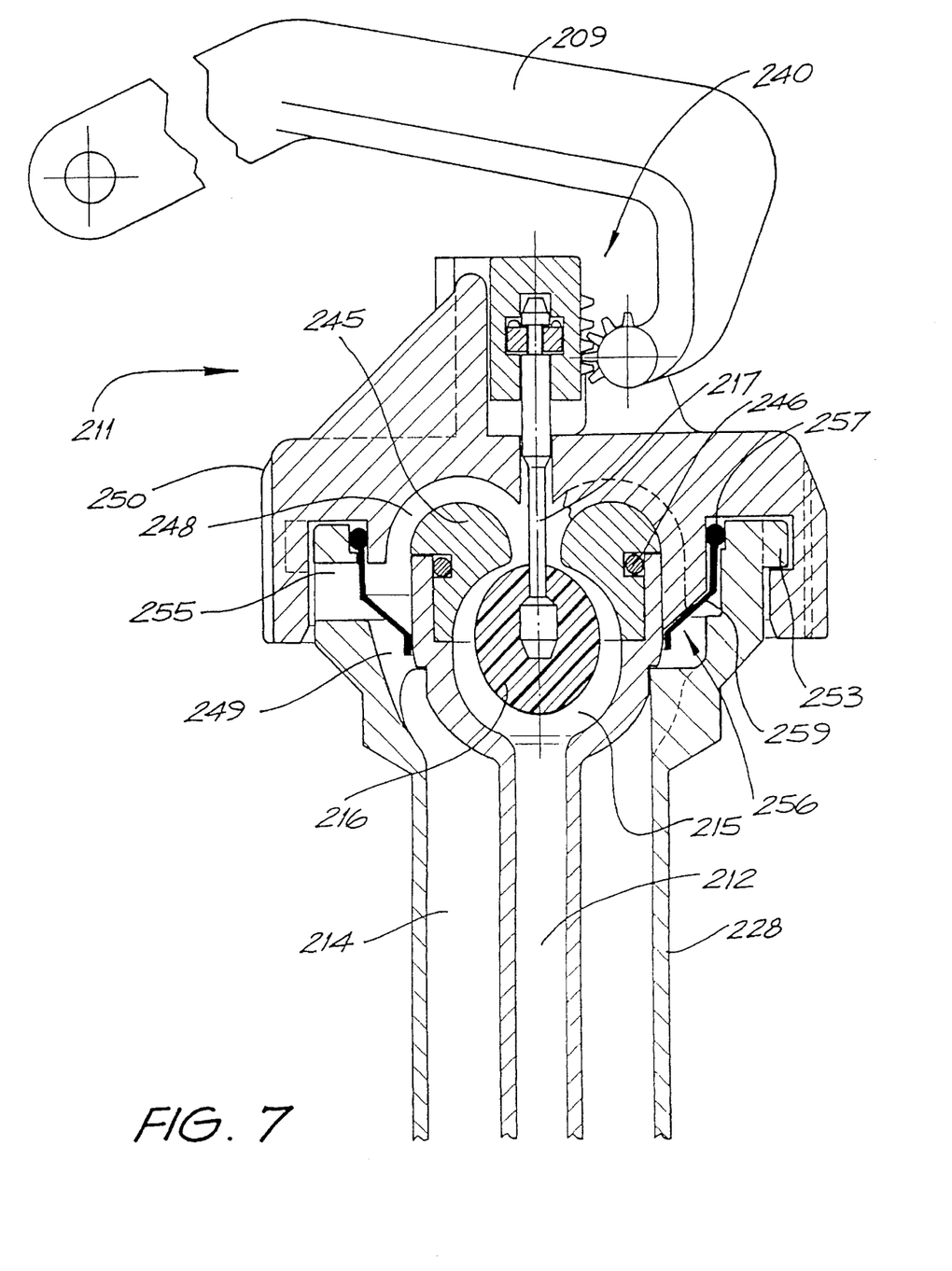
FIG. 7 is a longitudinal cross-sectional view through the valve of FIG. 6.

As seen in FIG. 7, the stem 228 is formed from two concentric cylindrical members, the inner one of which is the inlet 212 which is surrounded by the outlet 214. Adjacent the base of the outlet are one or more openings 241 which restrict the outlet flow as will be explained hereafter. The entire arrangement (FIG. 6) is able to be mounted in known fashion in an opening in the base of the cistern 19 (illustrated in phantom) and sealingly clamped in position by means of a nut 242.

Figure 8:
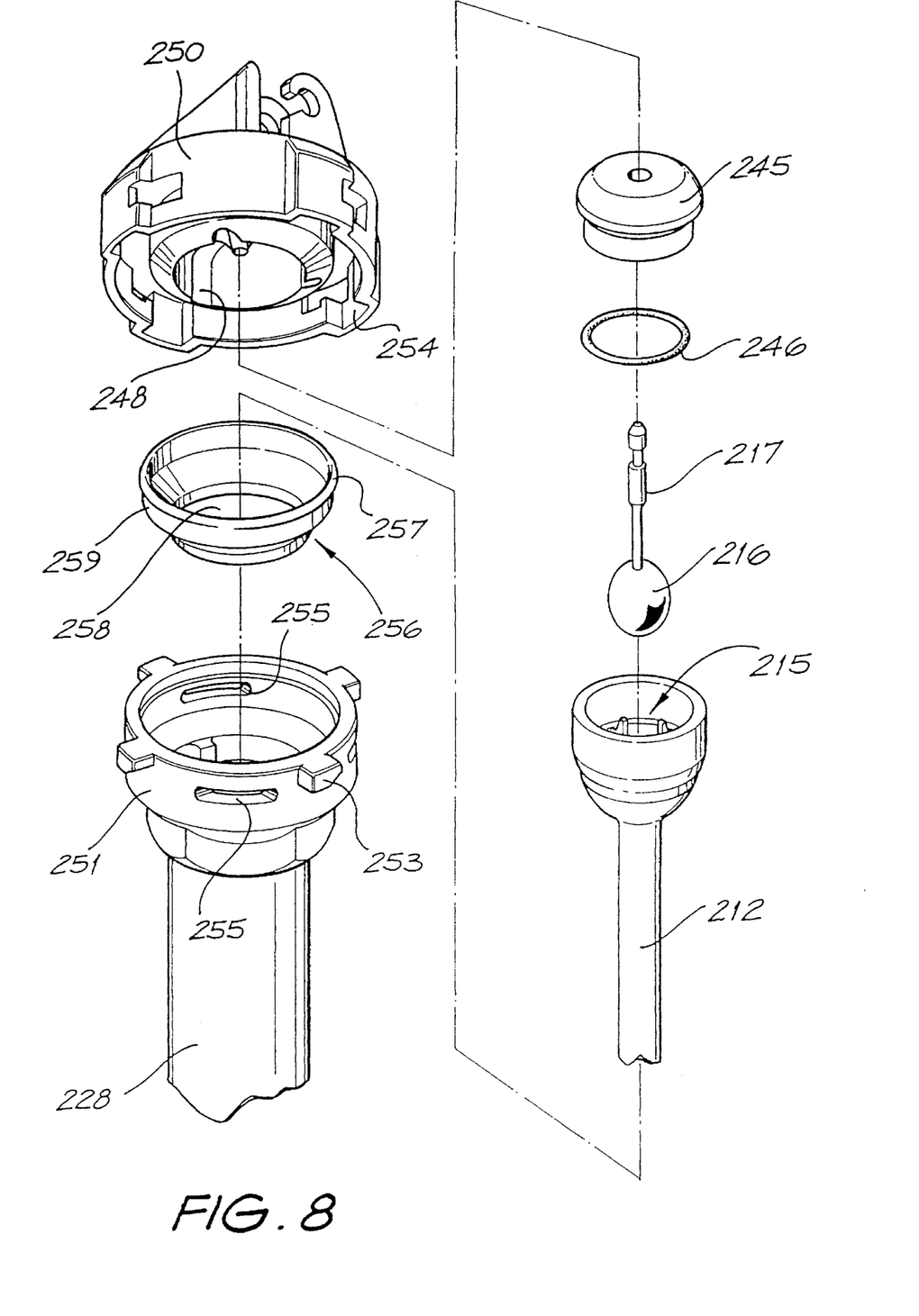
FIG. 8 is an exploded perspective view of the valve of FIG. 7.
Figures 9, 10, 11, 12:
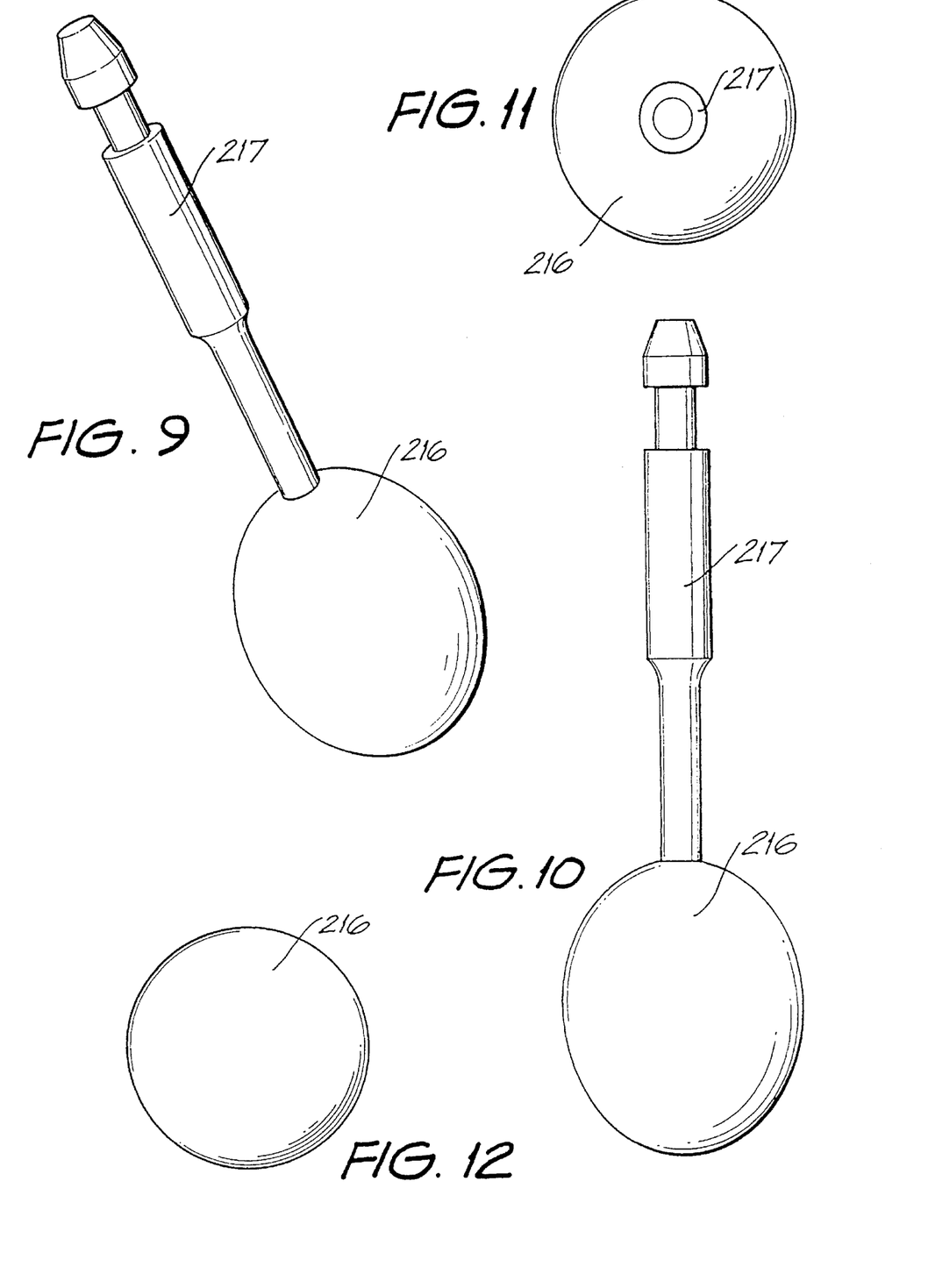
FIGS. 9 to 12 are respectively perspective, side elevational, plan and inverted plan views of the valve body of FIGS. 6 to 8.

As best seen in FIG. 8, the inlet 212 opens into a valve cavity 215 which includes an egg-like valve body 216 which is positioned at the lower end of a valve spindle 217. The valve spindle 217 is able to be raised or lowered by means of the rack and pinion mechanism 240 and float arm 209 in order to respectively close and open the valve 211. The valve cavity 215 is formed from two pieces, the upper one of which constitutes the valve seat 245. An O-ring 246 is clamped between the valve seat 245 and the remainder of the valve cavity 215.

Three generally U-shaped passages 248 of restricted cross-sectional size lead from the valve seat 245 into an annular chamber 249 which in turn opens into the outlet 214. The U-shaped passages 248 are formed by grooves positioned in the underside of a cap 250. The cap 250 is able to be secured to a bell 251 formed at the upper end of the stem 228 by means of bayonet fittings 253, 254. In this way the cap 250 can be secured to the bell 251 so as to clamp the valve seat 245 into position.

A number of small openings 255 extend through the bell 251 and thus permit air to be communicated from the atmosphere, via the annular space between the skirt of the cap 250 and the bell 251, and thence into the annular chamber 249. Positioned between the cap 250 and bell 251 is a frusto-conical rubber sleeve 256. The upper end of the sleeve 256 is formed with a rim 257 which functions as an O-ring and provides a seal between the bell 250 and cap 251. The sleeve 256 is provided with a central aperture 258 (FIG. 8) which, in the rest position illustrated in FIG. 7, presses against the exterior of the valve cavity 215.

When the valve spindle 217 is lowered by the float arm 209 pivoting in the anti-clockwise direction as seen in FIG. 7, then water is able to flow from the inlet 212, through the valve cavity 215, past the valve seat 245 and into the U-shaped passages 248. Since the passages 248 follow a smooth curve, this flow exhibits substantially streamlined behaviour thereby avoiding turbulence and cavitation.

In addition, the rubber sleeve 256 which initially blocks the flow of water from the U-shaped passages 248 into the annular chamber 249 is deformed outwardly by the water pressure now applied to the inner surface of the sleeve 256 via the open valve seat 245. The consequence of this pressure and the resulting water flow is that the rubber sleeve 256 expands outwardly so as to increase the effective diameter of its central aperture 258.

This movement of the rubber sleeve 256 provides two simultaneous effects. Firstly, the central aperture 258 of the rubber sleeve 256 effectively constitutes a variable aperture orifice which increases with increasing flow and/or pressure. This has the very desirable advantage of providing a pressure drop close to the valve seat 245.

In addition, the expansion of the rubber sleeve 256 radially outwardly under the influence of the water passing through the inlet valve 1, results in the central portion 259 of the rubber sleeve 256 effectively sealing the openings 255. As a consequence, no air can pass from atmosphere through the openings 255 and thereby be entrained with the water passing from the U-shaped passages 248 into the annular chamber 249 and thence into the outlet 214. This constitutes a very substantial noise reduction measure.

Finally, the restricted openings 241 at the base of the outlet 214 mean that the outlet 214 is quickly completely filled with water during operation of the valve. As a consequence, a substantial amount of splashing and bubbling noise is eliminated. Furthermore, the openings 241 are preferably of a restricted size so as to constitute a further pressure drop generating device. As a consequence the mains pressure is dropped in stages between the inlet and outlet thereby reducing the chance for the pressure within the water to drop below the water vapour pressure. It is the water pressure dropping below the water vapour pressure which gives rise to cavitation, and hence cavitation noise.

In FIGS. 9 to 12 the preferred form of the valve body 216 is illustrated. From these drawings it will be apparent that the valve body is not spherical.

It will be apparent to those skilled in the art that the above described arrangement provides a number of advantages. Firstly, the smallest passage in the inlet valve which is likely to be clogged by any grit or debris carried in the inlet water, is located at the valve seat 245. As a consequence, should any material be lodged at this position, it is likely to be dislodged at the next operation of the valve. Furthermore, any such material is able to be easily carried through the passages 248, past the central aperture 258 of the rubber sleeve 256 and into the annular chamber 249. From there any such debris is able to pass harmlessly into the interior of the cistern 19.

In addition, should there happen to be a partial vacuum applied to the inlet 212 whilst the inlet valve 211 is open, then the rubber sleeve 256 will be sucked inwardly thereby clamping the central aperture 258 against the exterior of the valve cavity 215. Furthermore, the central portion 259 of the rubber sleeve 256 will move inwardly thereby freeing the openings 255 and allowing atmospheric air into the outlet 214. As a consequence, any water in the outlet 214 will drop to the level of water within the cistern 19. In this way the prevention of any reverse siphoning is ensured.

Furthermore, in the event of a catastrophic failure, such as the valve stem 217 breaking, then the valve body 216 is forced upwardly by the inlet water pressure so as to close the valve seat 245. Thus in this regard the valve is "fail close" rather than "fail open" as for other hydraulic valves.

Figure 13:
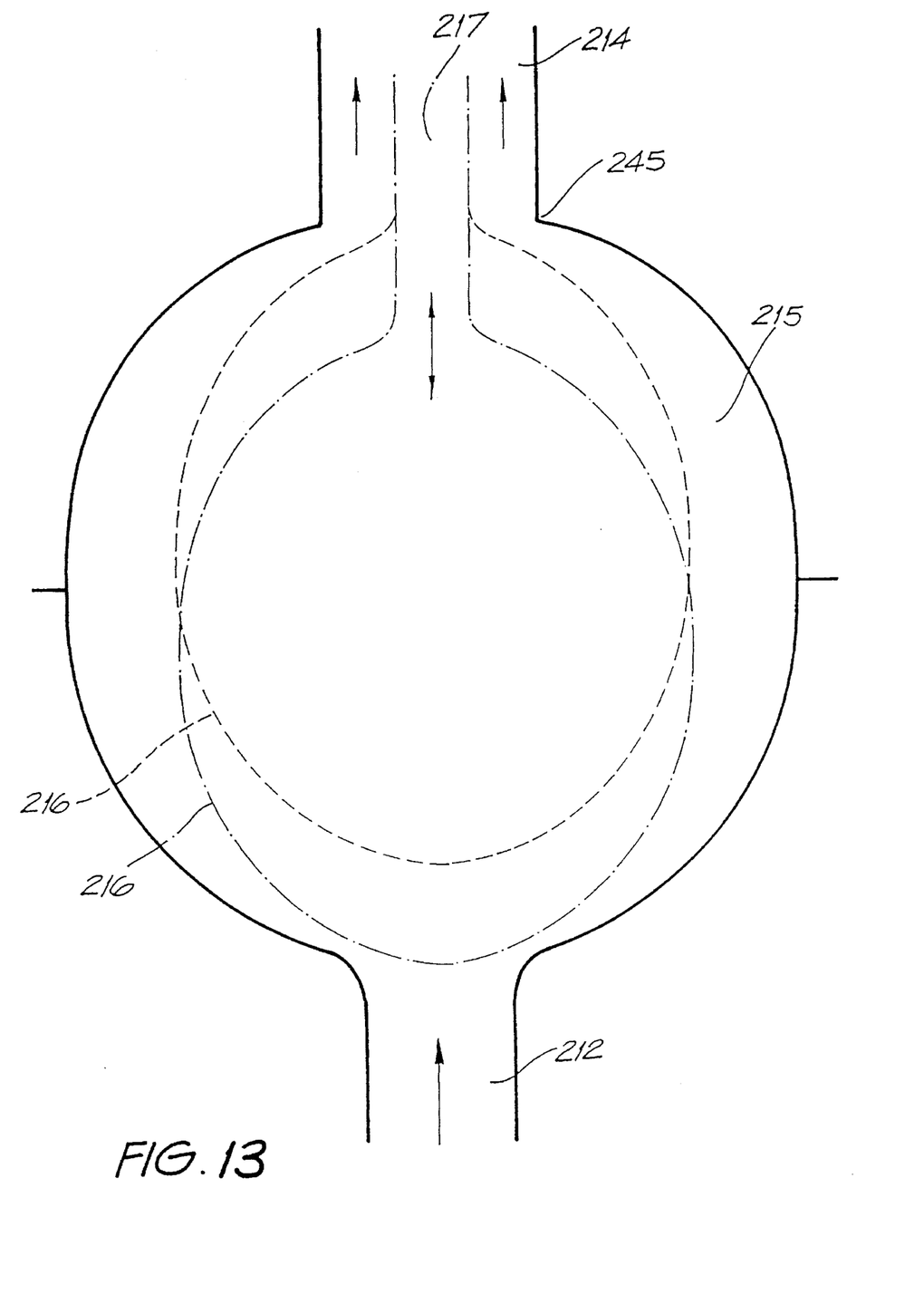
FIG. 13 is a sectional view through a valve body and cavity of the first embodiment which is utilised in explaining the operational principle of the present invention.

The principle of operation of the valve of FIGS. 6 and 7 will now be described with reference to FIG. 13 and utilising the designated numbers of FIG. 7. Firstly, it will apparent to those skilled in the art that if the valve is arranged vertically as illustrated in FIG. 13, then the influence of gravity which acts downwardly on the valve body 216 and spindle 217 is counteracted to a large part by the buoyancy of the valve body 216 and thus, to a substantial extent, these oppositely directed forces cancel. Conversely, if the valve is arranged horizontally then these forces are normal to the direction of motion of the spindle 217 and valve body 216 and thus may be ignored.

Illustrated by means of dot dash lines in FIG. 13 is the position of the valve body 216 when the valve is substantially fully open. It will be appreciated in this connection that the cross-sectional area available for flow within the cavity 215 adjacent the inlet 212 and between the interior surfaces of the cavity 215 and the exterior surface of the valve body 216, is substantially reduced. Conversely, the cross-sectional area available for flow between the exterior surface of the valve body 216 and the interior surface of the cavity 215 adjacent the outlet 214 is substantially increased.

The position in which the valve body 216 nearly occludes the valve seat 245 and outlet 214 is illustrated by dashed lines in FIG. 13. It will be apparent to those skilled in the art that the converse of the flow areas referred to above applies.

The valve body 216 is generally ovoid or ellipsoid. Preferably the valve body 216 is a Rankine ovuloid and thus in cross-section constitutes a Rankine oval for which the streamlined flow about the solid body can be calculated.

Because the flow within the cavity 215 about the valve body 216 is substantially streamlined and substantially without turbulence, the total energy in the liquid flow can be presumed to be a constant with substantially negligible energy losses. As a consequence, the energy at all points in the flow path is the same. The total energy per unit mass E at any given point is given by the following equation $$E = \frac{P}{\rho} + \frac{V^2}{2} \quad (1)$$

in which V is the velocity of the flow, P is the pressure at the point in question is p is the density of the liquid.

Since there is an assumption of no energy loss, the energy in the region adjacent the inlet i is the same as the energy in the region adjacent the outlet o. Thus, the following equation, which expresses Bernoulli's theory, applies $$\frac{Pi}{\rho} + \frac{Vi^2}{2} = \frac{Po}{\rho} + \frac{Vo^2}{2} \quad (2)$$

In addition, for flow the following relationship $$V = Q/A \quad (3)$$

applies where V is the velocity of the flow, Q is the flow rate and A is the cross-sectional area of the flow.

It follows from equations 2 and 3 above and because the liquid is for all practical purposes incompressible, so the density remains constant, that if the flow area increases, then the flow velocity will decrease. However, if the flow velocity decreases the pressure will increase in order to maintain the energy substantially constant. The converse also applies, that is, if the flow area decreases, then the velocity increases and the pressure decreases.

As a consequence of Pascal's principle, the pressure within the liquid is applied "equally in all directions" and is thus applied to the surface of the cavity 215 and, in particular, to the surface of the valve body 216. Thus, as will be apparent from FIG. 13, with the valve body 216 in the position indicated by dot dash lines in FIG. 13, the flow area adjacent the inlet 212 is decreased and thus the velocity of flow adjacent the inlet 212 is increased and the pressure applied to the free end of the valve body 216 is decreased. Conversely, adjacent the outlet, the flow area is increased and thus the flow velocity decreases. Similarly, the pressure applied to the valve body 216 adjacent the spindle 217 is increased. Since pressure represents a force divided by an area, and the area of the "hemisphere" of the valve body 216 connected to the spindle 217 is approximately equal to the area of the "hemisphere" of the free end of the valve body 216, the net pressure difference gives rise to a net force which therefore moves the valve body 216 away from the valve seat 245, against the direction of liquid flow, and thus maintains the valve open.

Because the liquid is flowing past the valve body 216, a drag force is generated which urges the valve body 216 towards the outlet. This drag force can be counteracted by making the surface area of the "hemisphere" of the valve body 216 connected to the spindle 217, greater than the surface area of the "hemisphere" of the free end of the valve body 216. For example, the spindle "hemisphere" can be a quasihemisphere whilst the other "hemisphere" can be a half elipsoid.

It follows from the above discussion that there is an equilibrium position in which the flow of liquid past the valve body 216 produces no net axial force on the spindle 217. However, small displacements of the valve body 216 in either direction away from the equilibrium position bring about an imbalance of forces which continues the valve opening or valve closing movement. This means that the valve is able to be easily controlled, even with the short float arm 209 as indicated in FIGS. 6 and 7. It will be apparent from FIGS. 6 and 7 that the initial downward movement of the float 210 brought about by emptying of the cistern 19, moves the valve body 216 downwardly so as to partially open the valve seat 245. The abovementioned pressure difference then comes into play and continues to open the valve 211. The downward movement of the valve body 216 is preferably limited by restricting the downward movement of the stem 217. Alternatively, the valve body 216 eventually comes into contact with the inlet 212.

As the cistern 19 fills because of the water introduced into the cistern via the inlet valve 111, the float 210 rises thereby raising the float arm 209 and moving the valve body 216 upwardly as seen in FIG. 7 towards the equilibrium position. Once the equilibrium position is passed, the pressure difference applied to the valve body 216 tends to raise the valve body 216 and thus acts in concert with the rising float 210. This brings about closing of the valve during which the valve body 216 is urged o upwardly by both the action of the float 210 and the pressure difference applied to the opposite "hemispheres" of the valve body 216. This results in a firm and quick closing action.

It will be apparent to those skilled in the art that the above described valve arrangement give rise to a valve which is easily opened and closed. Once the valve commences to open or close and the bulbous body passes the "equilibrium" position, then the valve opens or closes fully due to the imbalance of forces. Thus the amount of energy required to operate the valve is small compared with a conventional valve. This feature makes the valve suitable for use with very short float arms.

In addition, the relative areas of the two "hemispheres" of the bulb 16/116/216 can be adjusted to ensure that during the entire "stroke" there is a net closing pressure. Thus, even if there is a catastrophic failure such as the fracture of the upper end of the spindle or of the float arm, the valve will always close after a limited amount of flow and then remain closed. Thus the fail open mechanisms of the conventional hydraulic inlet valve are substantially avoided.

Furthermore, because substantially streamlined flow with substantially zero audible cavitation and negligible turbulence takes place, a substantial reduction in noise is able to be achieved.

The foregoing describes only three embodiments of the present invention and modification, obvious to those skilled in the art, can be made thereto without departing so from the scope of the present invention.

What I claim is:

1. A valve comprising:

a valve housing which has an inlet leading into, and an outlet leading from, an interior cavity, with said inlet and outlet being substantially opposed; and a generally bulbous valve body located within said cavity and mounted for movement towards and away from said outlet, said valve body and said outlet being sized to permit said outlet to be occluded by said valve body;

means for reciprocally moving said valve body longitudinally and extending from to said valve body;

wherein said interior surface of said cavity and said exterior surface of said valve body are adapted to provide pressure and flow balance in said valve so as to reduce the cross-sectional area available for flow towards said outlet and between said valve body and said cavity and to simultaneously increase the cross-sectional area available for flow from said inlet and between said valve body and said cavity as said valve body moves towards said outlet, and to increase a cross-sectional area available for flow towards said outlet and between said valve body and said cavity and to simultaneously decrease the cross-sectional area available for flow from said inlet and between said valve body and said cavity as said valve body moves away from said outlet, said cavity and said valve body thereby altering a balance flow velocity induced pressure forces acting on said valve body.

2. A valve as claimed in claim 1 wherein said means for moving said valve body comprises a spindle which passes through said outlet, said spindle having said valve body mounted thereon.

3. A valve as claimed in claim 2 wherein said spindle is mounted for longitudinal reciprocal motion thereof.

4. A valve as claimed in claim 1 wherein said outlet is curved and extends around said interior cavity towards said inlet.

5. A valve body as claimed in claim 4 wherein said outlet comprises a plurality of parallel connected passage ways.

6. A valve body as claimed in claim 4 wherein said valve outlet surrounds said valve inlet.

7. A valve as claimed in claim 1 wherein said outlet includes at least one opening connected to atmosphere.

8. A valve as claimed in claim 7 wherein said at least one opening to atmosphere is occluded when said outlet is not occluded.

9. A valve as claimed in claim 1 wherein said bulbous body is selected from the group consisting of an ovoid, an ellipsoid and a Rankine ovuloid.

10. A method of controlling flow through a pressure and flow balanced valve comprising a valve housing which has an inlet leading into, and an outlet leading from, an interior cavity, with said inlet and outlet being substantially opposed, and a generally bulbous valve body located within said cavity, said method comprising the steps of:

moving said valve body away from said outlet to increase the cross-sectional area available for flow between said body and said cavity adjacent said outlet and to simultaneously reduce the cross-sectional area available for flow between said body and said cavity adjacent said inlet, to thereby apply a net flow induced pressure force to said body acting to continue said valve body motion away from said outlet and open said valve, and moving said valve body towards said outlet to reduce the cross-sectional area available for flow between said body and said cavity adjacent said outlet and to simultaneously increase the cross-sectional area available for flow between said body and said cavity adjacent said inlet, to thereby apply a net flow induced pressure force to said body acting to continue said valve body motion towards said outlet and close said valve.

11. A method as claimed in claim 10 wherein said valve body is moved through an equilibrium position at which said flow induced pressure force is substantially zero.

12. A method as claimed in claim 10 including the step of limiting the movement of said valve body away from said outlet to prevent said valve body coming into contact with said inlet.

13. A flush tank inlet valve comprising:

a valve housing which has an inlet leading into, and an outlet leading from, an interior cavity, with said inlet and outlet being substantially opposed; and a generally bulbous valve body located within said cavity and mounted for movement towards and away from said outlet, said valve body and said outlet being sized to permit said outlet to be occluded by said valve body;

means for reciprocally moving said valve body longitudinally and extending from said valve body;

wherein said interior surface of said cavity and said exterior surface of said valve body are adapted to provide pressure and flow balance in said valve so as to reduce the cross-sectional area available for flow towards said outlet and between said valve body and said cavity and to simultaneously increase the cross-sectional area available for flow from said inlet and between said valve body and said cavity as said valve body moves towards said outlet, and to increase a cross-sectional area available for flow towards said outlet and between said valve body and said cavity and to simultaneously decrease the cross-sectional area available for flow from said inlet and between said valve body and said cavity as said valve body moves away from said outlet, said cavity and said valve body thereby altering a balance of flow velocity induced pressure forces acting on said valve body.

14. A cistern inlet valve mounted at the upper end of a stem having an inlet for a flush tank comprising:

a valve housing which has said inlet leading into, and an outlet leading from, an interior cavity, with said inlet and outlet being substantially opposed; and a generally bulbous valve body located within said cavity and mounted for movement towards and away from said outlet, said valve body and said outlet being sized to permit said outlet to be occluded by said valve body;

means for reciprocally moving said valve body longitudinally and extending from said valve body;

wherein said interior surface of said cavity and said exterior surface of said valve body are adapted to provide pressure and flow balance in said valve to as to reduce the cross-sectional area available for flow towards said outlet and between said valve body and said cavity and to simultaneously increase the cross-sectional area available for flow from said inlet and between said valve body and said cavity as said valve body moves towards said outlet, and to increase a cross-sectional area available for flow towards said outlet and between said valve body and said cavity and to simultaneously decrease the cross-sectional area available for flow from said inlet and between said valve body and said cavity as said valve body moves away from said outlet, said cavity and said valve body thereby altering a balance of flow velocity induced pressure forces acting on said valve body.

15. A flush tank incorporating a cistern inlet valve mounted at the upper end of a stem having an inlet for said flush tank, said flush tank comprising:

a valve housing which has said inlet leading into, and an outlet leading from, an interior cavity, with said inlet and outlet being substantially opposed; and a generally bulbous valve body located within said cavity and mounted for movement towards and away from said outlet, said valve body and said outlet being sized to permit said outlet to be occluded by said valve body;

means for reciprocally moving said valve body longitudinally and extending from said valve body;

wherein said interior surface of said cavity and said exterior surface of said valve body are adapted to provide pressure and flow balance in said valve so as to reduce the cross-sectional area available for flow towards said outlet and between said valve body and said cavity and to simultaneously increase the cross-sectional area available for flow from said inlet and between said valve body and said cavity as said valve body moves towards said outlet, and to increase a cross-sectional area available for flow towards said outlet and between said valve body and said cavity and to simultaneously decrease the cross-sectional area available for flow from said inlet and between said valve body and said cavity as said valve body moves away from said outlet, said cavity and said valve body thereby altering a balance of flow velocity induced pressure forces acting on said valve body.

16. A method of controlling flow through a flush tank valve comprising a valve housing which has an inlet leading into, and an outlet leading from, an interior cavity, with said inlet and outlet being substantially opposed, and a generally bulbous valve body located within said cavity and being movable in response to a level of water within a flush tank, said method comprising the steps of:

moving said valve body away from said outlet to increase the cross-sectional area available for flow between said body and said cavity adjacent said outlet and to simultaneously reduce the cross-sectional area available for flow between said body and said cavity adjacent said inlet, to thereby apply a net flow induced pressure force to said body acting to continue said valve body motion away from said outlet and open said valve, and moving said valve body towards said outlet to reduce the cross-sectional area available for flow between said body and said cavity adjacent said outlet and to simultaneously increase the cross-sectional area available for flow between said body and said cavity adjacent said inlet, to thereby apply a net flow induced pressure force to said body acting to continue said valve body motion towards said outlet and close said valve.

17. A method as claimed in claim 16 further comprising the step of interconnecting said body with a float in said flush tank via a float arm.

18. A method of filling a flush tank comprising a valve housing which has an inlet leading into, and an outlet leading from, an interior cavity, with said inlet and outlet being substantially opposed, and a generally bulbous valve body located within said cavity and being movable in response to a level of water within said flush tank, said method comprising the steps of:

moving said valve body away from said outlet to increase the cross-sectional area available for flow between said body and said cavity adjacent said outlet and to simultaneously reduce the cross-sectional area available for flow between said body and said cavity adjacent said inlet, to thereby apply a net flow induced pressure force to said body acting to continue said valve body motion away from said outlet and open said valve, and moving said valve body towards said outlet to reduce the cross-sectional area available for flow between said body and said cavity adjacent said outlet and to simultaneously increase the cross-sectional area available for flow between said body and said cavity adjacent said inlet, to thereby apply a net flow induced pressure force to said body acting to continue said valve body motion towards said outlet and close said valve.

* * * * *